June 21, 1932. H. L. KRAEFT 1,863,859

CYCLE CONSTRUCTION AND METHOD OF PACKING

Original Filed May 29, 1930

Inventor

Herman L. Kraeft

By Bates Goldrick & Teare

Attorney

Patented June 21, 1932

1,863,859

UNITED STATES PATENT OFFICE

HERMAN L. KRAEFT, OF CLEVELAND, OHIO, ASSIGNOR TO MURRAY-OHIO MFG. COMPANY, OF CLEVELAND, OHIO, A CORPORATION OF OHIO

CYCLE CONSTRUCTION AND METHOD OF PACKING

Original application filed May 29, 1930, Serial No. 457,256. Divided and this application filed December 29, 1930. Serial No. 505,221.

This application is a division of my prior application Serial No. 457,256, filed May 29, 1930.

The object of this invention is to provide a cycle construction by virtue of which the main frame parts may be folded into a relatively small space without disassociating the parts.

Other objects and features of the invention will become apparent from the following description relating to the accompanying drawing, showing the preferred form of the invention. The essential characteristics are summarized in the claims.

Figure 1:
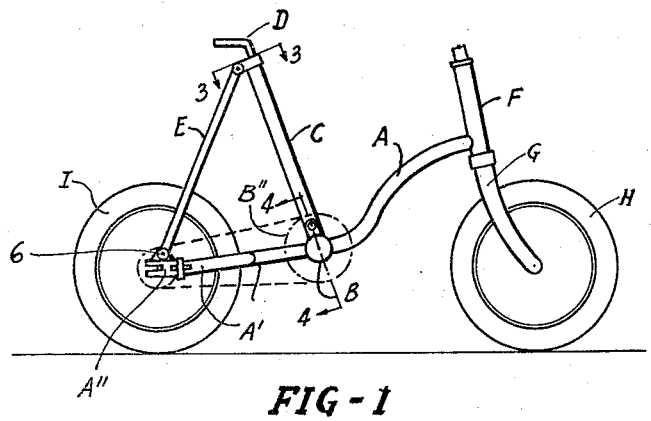
Figure 2:
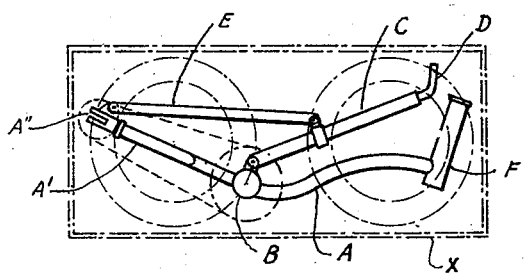
Figure 3:
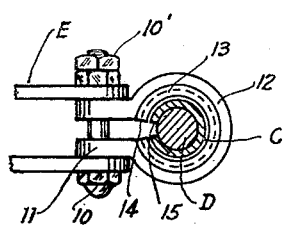
Figure 4:
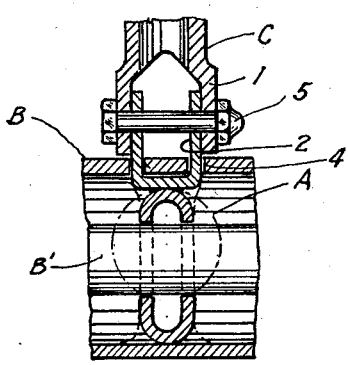

In the drawing, Fig. 1 is a side elevation of a sidewalk bicycle incorporating the invention, the handlebars and seat not being shown; Fig. 2 is a view of the folded frame in a suitable container, the wheels and container being shown in broken lines, and Figs. 3 and 4 are sectional views substantially according to the lines 3—3 and 4—4 on Fig. 1.

It has been the usual practice to make cycle frames with the steering column, center frame part or backbone, seat supporting mast and backstays, substantially rigid, requiring that the packing container for the cycle shall be as large as the overall dimensions of the assembled frame parts just mentioned. The expedient of detaching some of the main frame parts, above mentioned, from each other, in order to condense the size of the frame for packing and shipment, requires more work on part of the dealers or ultimate users than they are willing to undertake, in order to fully assemble the cycle and make it ready for use. The dealers and users however, have no objection to attaching the wheels, handlebars and seats, because these parts are very simply mounted, and the dealers and users are accustomed to receiving the wheels, etc. detached from the main frame. The invention, as above stated, solves the problem; the main frame being so arranged that it will collapse, but without necessitating taking the frame apart.

As shown in the drawing, the main center frame member is shown at A. The member A is usually called the "backbone" and the rearward end thereof is bifurcated at A′ in any suitable way (not shown) to embrace the rear wheel, there being, as usual, suitable adjusting brackets, one indicated at A″, permitting the wheel axle to be moved longitudinally of the backbone to tighten or loosen the driving chain, as desired. Intermediately of the ends of the backbone is a suitable pedal shaft hanger B forming a suitable support for the pedal shaft B′ (Fig. 4) which carries the usual sprocket wheel and pedals, the sprocket wheel being indicated at B″ in broken lines.

The present arrangement includes a suitable hinge formation on the crank shaft hanger for attaching the seat supporting mast, indicated at C. For example, the lower end of the mast C may be bifurcated as at 1 and a suitable U-shaped bracket 2 may be rigidly supported on the crank shaft hanger, as by welding the same in place in suitable openings 4 in the upper hanger wall. As shown, there is a pivot bolt 5 securing the bifurcated portion of the mast to the U-shaped bracket.

The parts of the cycle, in addition to the center frame member or the backbone and the mast C, are merely illustrative of the conventional arrangement of parts, there being a seat post D for the usual seat (not shown), backstay members, one being shown at E, a steering column F, and a front wheel fork G suitably supported in the steering column. There are, of course, suitable front and rear wheels indicated at H and I, respectively.

The backstay members E may be pivoted in the usual way, as at 6, to the adjustable brackets A″ forming the rear extremity of the backbone. The upper ends of the backstay members are pivotally secured as by a suitable bolt 10 to rearwardly extending ears 11 on a clamping strap 12. The clamping strap 12, as shown, includes a bushing 13 of suitable form which is split, as at 14, to enable it to be compressed onto the mast C. The inside diameter of the bushing is originally larger than the outside diameter of the mast but, due to splitting in the manner indicated, the inside diameter of the bushing may be made to conform to the diameter of the mast, when clamping force is applied to the strap, as will be obvious. The upper end of the mast C is also split as at 15. It will be seen, that when clamping force is exerted by the nuts 10' of the bolt 10, the bushing 13 will be tightly clamped onto the mast, and at the same time the mast will be rightly clamped against the seat post D, holding the latter at the desired elevation.

Now, when arranging the parts for shipment, it will be seen that it is a simple matter to loosen the nuts 10', relieving the clamping action of the bushing 13 on the mast, and to then simply slide the clamp 12 with its bushing 13 downwardly on the mast, as the mast and backstay members are swung forwardly toward the steering column and backbone (see Fig. 2). Thus the overall size of the frame, assuming the seat, front steering fork and handlebars have been removed, becomes as indicated in Fig. 2. The frame, the wheels and the other parts of the cycle may then be packed in a relatively small container, such as diagrammatically indicated in broken lines at X.

I claim:

1. A cycle frame, comprising, a main central frame member, a seat post supporting mast hinged to the central member, a backstay hingedly connected to the central member, and a clamp adapted to be released and to slide on said mast, the clamp member being pivotally connected to the upper end of the backstay whereby the mast may be swung forwardly toward the main frame member, without disassociating the said frame parts, to collapse the frame.

2. A cycle construction, comprising, a main frame or backbone, a steering column rigidly secured to the forward end of the backbone, a crank hanger rigidly secured intermediately of the ends of the backbone, a seat supporting mast hinged to the crank hanger, a backstay, means pivotally connecting the lower end of the backstay with the backbone, and a clamp embracing the mast and adapted to slide along the same, there being means pivotally connecting the clamp with the upper end of the backstay whereby the clamp may be released and slid along the mast to collapse the mast and backstay forwardly toward the backbone and steering column to condense the overall size of the frame, without detaching any of said parts from each other.

3. In a cycle construction, a main frame element, a seat post and tubular seat post supporting mast pivotally supported by said element, a backstay for the mast, a clamp in embracing relation to the upper portion of the mast, the backstay being pivotally secured to the said main frame and to the clamp, the clamp being arranged to slide along the mast as the mast is swung forwardly to collapsed position for packing and shipment, the clamp comprising a strap cylindrically formed to embrace the mast and having spaced ears to support the backstay, the upper end of the mast being split, and there being a single clamping bolt associating the backstay with the mast through the medium of the clamp at said ears and simultaneously acting to clamp the seat post in position in the mast.

4. A cycle frame comprising a back bone, a seat post supporting mast and a back stay, said back stay and seat post supporting mast being hingedly connected to the backbone and slidably connected with each other, whereby the back bone, seat post supporting mast and back stay may be folded together without detaching any of said parts from each other.

5. A cycle frame comprising a main frame member, a steering column integral with one end of said frame member, a back stay hingedly connected to the other end of said frame member, a seat post supporting mast hingedly connected to the main frame member immediate the ends thereof, and means for slidably and pivotally connecting the back stay with the seat post supporting mast, whereby the supporting mast and back stay can be pivoted about the main frame member for decreasing the overall dimension for packing purposes.

6. A cycle frame comprising a main frame member, a seat post supporting mast hingedly connected to said main frame member, a seat post adapted to slide in said supporting mast, the supporting mast being split adjacent the seat post, a clamp surrounding said seat post supporting mast and adapted to slide thereon, said clamp being adapted to draw the split portion of the supporting mast together to lock the seat post in any desired position, a back stay member pivotally connected to said frame member, and to said clamp, whereby the clamp may be released and slide along the mast to collapse the mast and back stay forwardly toward the main frame to condense the overall size of the frame without detaching any of said parts from each other.

In testimony whereof, I hereunto affix my signature.

HERMAN L. KRAEFT.